United States Patent

Hattori et al.

[11] Patent Number: 5,225,007
[45] Date of Patent: Jul. 6, 1993

[54] METHOD FOR WEAR-RESISTANT COMPOUND ROLL MANUFACTURE

[75] Inventors: Toshiyuki Hattori; Masahiko Ooshima; Noriyoshi Fuchigami, all of Kitakyusyu, Japan

[73] Assignee: Hitachi Metals Ltd., Tokyo, Japan

[21] Appl. No.: 858,425

[22] Filed: Mar. 24, 1992

Related U.S. Application Data

[63] Continuation-in-part of Ser. No. 661,154, Feb. 27, 1991, abandoned.

[30] Foreign Application Priority Data

Feb. 28, 1990 [JP] Japan .................... 2-49032

[51] Int. Cl.⁵ .................... C22C 38/12
[52] U.S. Cl. .................... 148/541; 148/542; 148/543; 148/324; 29/895.3; 492/58; 492/59
[58] Field of Search .............. 148/541, 542, 543, 321, 148/324, 330, 334, 336, 337; 29/132; 428/683, 684, 685

[56] References Cited

U.S. PATENT DOCUMENTS

| | | | |
|---|---|---|---|
| 3,909,252 | 9/1975 | Kuriyama et al. | 420/9 |
| 3,929,523 | 12/1975 | Kinoshi et al. | 148/143 |
| 4,721,153 | 1/1988 | Sano et al. | 29/132 |
| 4,726,417 | 2/1988 | Sano | 29/132 |
| 4,958,422 | 9/1990 | Oshima et al. | 29/129.5 |
| 5,081,760 | 1/1992 | Kikuhara et al. | 29/132 |

FOREIGN PATENT DOCUMENTS

3236268 6/1983 Fed. Rep. of Germany.

OTHER PUBLICATIONS

Patent Abstracts of Japan, vol. 12, No. 358, Sep. 26, 1988, JP-A-63-114937.
Patent Abstracts of Japan, vol. 13, No. 79, Feb. 22, 1989, JP-A-63-266043.

*Primary Examiner*—R. Dean
*Assistant Examiner*—Sikyin Ip
*Attorney, Agent, or Firm*—Sughrue, Mion, Zinn, Macpeak & Seas

[57] ABSTRACT

The wear-resistant compound roll is constituted by a shell portion made of an iron-base alloy having the composition consisting essentially of 1.0-3.5 weight % of C, 3.0 weight % or less of Si, 1.5 weight % or less of Mn, 2-10 weight % of Cr, 9 weight % or less of Mo, 20 weight % or less of W, 2-15 weight % of V, 0.08 weight % or less of P, 0.06 weight % or less of S, 300 ppm or less of B, the balance being substantially Fe and inevitable impurities, and a shaft portion made of steel. The iron-base alloy of the shell portion has a structure containing by an area ratio 5-30% of granular carbides and 5% or less of non-granular carbides, an alloy matrix of the shell portion having a Vickers hardness (Hv) of 550 or more. This compound roll has excellent wear resistance and resistance to surface roughening.

11 Claims, 2 Drawing Sheets

50μm

50μm

50μm

METHOD FOR WEAR-RESISTANT COMPOUND ROLL MANUFACTURE

This is a continuation-in-part of application No. 07/661,154 filed Feb. 27, 1991, abandoned.

BACKGROUND OF THE INVENTION

The present invention relates to a wear-resistant compound roll, and more particularly to a wear-resistant compound roll having high strength, wear resistance and resistance to surface roughening.

With respect to rolls, increasingly higher wear resistance and resistance to surface roughening have been required to prevent the deformation of rolled products due to the wear of the rolls and to reduce the frequency of exchanging rolls. In conventional centrifugal cast rolls, to prevent the gravitational segregation in shell portions and to achieve the graphitization of cast alloys for the shaft portions for the purpose of having higher toughness, the shell portions should have particularly limited chemical compositions. As a result, the above demands are not satisfied in the centrifugal cast rolls.

In such circumstances, the inventors previously proposed, as a method of producing a new roll free from the above restriction of the chemical composition of a shell portion, a continuous casting method for forming a shell portion around a shaft portion by using a high-frequency coil (Japanese Patent Laid-Open No. 61-60256, WO 88/07594 corresponding to U.S. Pat. No. 4,958,422 issued Sept. 25, 1990). By the development of such a method, elements such as V, W, Mo, etc. capable of forming hard carbides can be added to a shell portion material in large amounts, thereby providing rolls having durability several times higher than the conventional centrifugal cast rolls. However, it has been found that such rolls are not necessarily satisfactory in a resistance to surface roughening. This means that depending upon the conditions of using rolls, the surface roughening may take place, resulting in a rolling durability only about two times that of the conventional centrifugal cast rolls.

As a result of investigation on the surface roughening and the alloy structure of the roll, the inventors have found that the surface roughening phenomenon of the wear-resistant compound roll has a close relation with the microstructure of the shell portion, and that by controlling the microstructure, the resistance to surface roughening can be greatly improved. On the other hand, when there are a lot of non-granular carbides, particularly network-shaped carbides in the microstructure, cracks are generated predominantly at the sites of these carbides and propagate therefrom, thereby causing surface roughening due to such cracks.

OBJECT AND SUMMARY OF THE INVENTION

Accordingly, an object of the present invention is to provide a wear-resistant compound roll having not only a good wear resistance but also an excellent resistance to surface roughening.

As a result of intense research in view of the above object, the inventors have found that to prevent the surface roughening of the shell portion of the wear-resistant compound roll, it is necessary to reduce the amounts of non-granular carbides while increasing the amounts of granular carbides to some level in the shell portion, and that to this end the amount of B in the shell portion should be reduced. The present invention has been completed based upon this finding.

The wear-resistant compound roll according to the present invention comprises a shell portion made of an iron-base alloy having the composition consisting essentially of 1.0-3.5 weight % of C, 3.0 weight % or less of Si, 1.5 weight % or less of Mn, 2-10 weight % of Cr, 9 weight % or less of Mo, 20 weight % or less of W, 2-15 weight % of V, 0.08 weight % or less of P, 0.06 weight % or less of S, 300 ppm or less of B, the balance being substantially Fe and inevitable impurities, and a shaft portion made of steel, the iron-base alloy of the shell portion having a structure containing by an area ratio 5-30% of granular carbides and 5% or less of non-granular carbides, an alloy matrix of the shell portion having a Vickers hardness (Hv) of 550 or more.

The present invention also relates to a method for producing the above-described wear-resistant compound roll in such a fashion that the shell portion contains 300 ppm or less B. That is, the present invention relates to a method for producing a wear-resistant compound roll comprising a steel shaft portion and a shell portion comprising an iron-base alloy having a structure containing by an area ratio 5-30% of granular carbides and 5% or less of non-granular carbides comprising:

a) forming said shell portion by a continuous casting method using a melt consisting essentially of 1.0-3.5 weight % of C, 3.0 weight % or less of Si, 1.5 weight % or less of Mn, 2-10 weight % of Cr, 9 weight % or less of Mo, 20 weight % or less of W, 2-15 weight % of V, 0.08 weight % or less of P, 0.06 weight % or less of S, 300 ppm or less of B, the balance being substantially Fe and inevitable impurities, and b) sealing the surface of the shaft portion and the surface of the melt forming the shell portion with a flux containing no B or B compounds and consisting essentially of $SiO_2$, at least one of $Na_2O$ and KO, and at least one oxide of a metal other than B, wherein the resulting shell portion, after sealing, contains 300 ppm or less B.

DETAILED DESCRIPTION OF THE INVENTION

Figure 1:
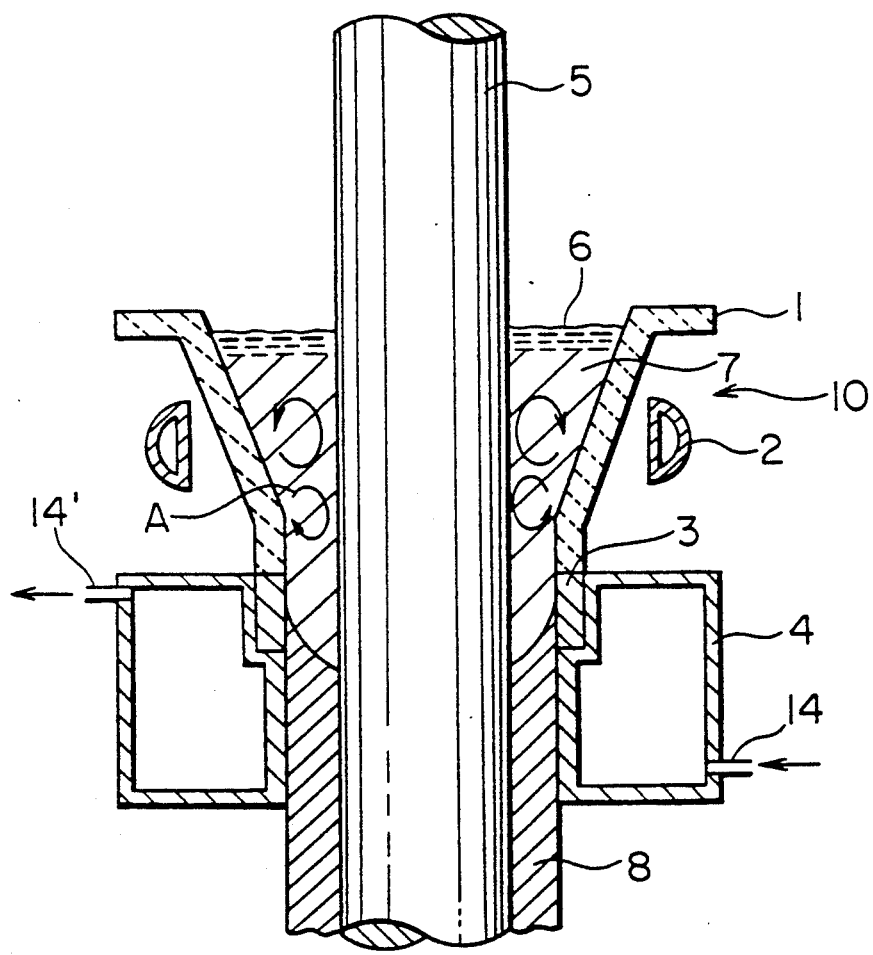
FIG. 1 is a schematic cross-sectional view showing an apparatus for producing the wear-resistant compound roll of the present invention.

In the present invention, the granular carbides are carbides expressed by MC, $M_4C_3$, etc. The granular carbides generally have a high hardness. The amount of the granular carbides in the shell portion is 5-30% by an area ratio. When the amount of the granular carbides is less than 5%, a sufficient effect of improving the wear resistance cannot be obtained. On the other hand, when it exceeds 30%, the carbides cannot be uniformly dispersed in the alloy matrix.

The non-granular carbides in the present invention are carbides formed in a non-granular shape by the growth of the eutectic carbides expressed by $M_{23}C_6$, $M_7C_3$, $M_2C$, $M_6C$, etc. The amount of the non-granular carbides in the shell portion should be 5% or less by an area ratio. When the amount of the non-granular carbides exceeds 5%, cracks are likely to be generated, resulting in the deterioration of the resistance to surface roughening.

The shell portion should have an alloy matrix having a Vickers hardness (Hv) of 550 or more. When the Vickers hardness (HV) of the alloy matrix is lower than 550, the shell portion shows a reduced wear resistance.

The composition of the shell portion will be explained below in detail.

C is an indispensable element for forming carbides to increase the wear resistance of the shell portion. If it is less than 1.0 weight %, the amount of carbides precipitated is small, resulting in an insufficient wear resistance. On the other hand, when C exceeds 3.5 weight %, an excess amount of carbides is formed, resulting in a poor toughness. The preferred amount of C is 1.3-2.5 weight %.

Si is a necessary element as a deoxidizer. It is also necessary to keep the flowability of the melt. When it exceeds 3.0 weight %, the resulting shell portion becomes too brittle. The preferred amount of Si is 0.2-2.0 weight %.

Mn has a function of deoxidizing and trapping S, which is an impurity, as MnS. When it exceeds 1.5 weight %, retained austenite tends to be generated, making it difficult to maintain stably a sufficient hardness. The preferred amount of Mn is 0.2-1.2 weight %.

With respect to Cr, when it is less than 2 weight %, the hardenability of the alloy becomes poor, and when it exceeds 10 weight %, too much chromium carbides are generated. This is undesirable because chromium carbides such as $M_{23}C_6$ are lower in hardness than MC, $M_4C_3$ and $M_2C$, so that they tend to reduce the wear resistance. The preferred amount of Cr is 3-8 weight %.

Mo is necessary for obtaining good hardenability and high-temperature hardness, but when it exceeds 9 weight %, the amount of $M_6C$ carbides increases in a balance between C, V and Mo, undesirably deteriorating the toughness and resistance to surface roughening. Accordingly, the upper limit of Mo content is 9 weight %. The preferred amount of Mo is 1-7 weight %.

W is necessary for keeping the high-temperature hardness, but when it exceeds 20 weight %, the amount of $M_6C$ carbides increases, undesirably deteriorating the toughness and resistance to surface roughening.. Accordingly, its upper limit is 20 weight %. The preferred amount of W is 12 weight % or less.

V is an indispensable element for forming MC carbides which are effective for increasing the wear resistance. When it is less than 2 weight %, sufficient effects cannot be obtained, and when it exceeds 15 weight %, the melt is severely oxidized, making it difficult to carry out the melting of the alloy in the air. The preferred amount of V is 3-12 weight %.

Beside the above elements, the iron-base alloy consists substantially of iron except for impurities. Major impurities are P and S, and it is necessary that P is 0.08 weight % or less and S is 0.06 weight % or less for preventing the alloy from becoming brittle.

The important feature of the present invention is that the amount of B, which is contained in the alloy as an inevitable impurity, is extremely small. Specifically, the amount of B is 300 ppm or less. B functions to accelerate the formation of non-granular (network-shaped) carbides in the alloy matrix, and it is concentrated in the non-granular carbides. As a result, the alloy loses toughness. Micro-cracks tend to be generated along the brittle network-shaped carbides. By this phenomenon, the detachment of crystal grains easily takes place from points at which the micro-cracks are formed. This causes severe wear and surface roughening of the shell portion. However, the inventors have found that when the amount of B is 300 ppm or less, the formation of non-granular carbides in the alloy matrix can be substantially prevented, and there are substantially no cracks generated along eutectic carbides. Therefore, the amount of B should be 300 ppm or less. The preferred amount of B is 100 ppm or less.

In addition to the above elements, the iron-base alloy for the shell portion according to the present invention may further contain Ni, Co or Nb alone or in combination.

Ni has a function to improve the hardenability of the alloy. Accordingly, in the case of large rolls, etc. which cannot be subjected to a hardening treatment at a high speed, it is preferably added in an amount up to 5 weight %. However, when the amount of Ni exceeds 5 weight %, austenite becomes too stable so that too much austenite is retained in the alloy structure, failing to provide the alloy with sufficient hardness. Accordingly, its upper limit is 5 weight %.

Co is a useful element for increasing the toughness and hardness at a high temperature. Accordingly, the resistance to surface roughening and wear resistance can be improved by adding Co. This effect is saturated in an amount of 5 weight %. Accordingly, the upper limit of Co is 5 weight %.

Nb has a function of forming granular carbides like V. Further, MC carbides, which are granular carbides, are made finer by Nb, thereby improving the wear resistance and resistance to surface roughening. However, when it exceeds 5 weight %, too much oxidation takes place, making it difficult to melt the alloy in the atmosphere.

Ni, Co and Nb may be added alone, but they can be added in combination.

The shaft portion of the compound roll of the present invention is made of steel, and it may be cast steel or forged steel. The shaft portion preferably has a tensile strength of 55 kg/mm$^2$ or more and an elongation of 1.0% or more. This is because when used for rolling, it is subjected to large pressure, and a bending force is applied both ends of the shaft portion to compensate the deflection of the roll during the rolling operation, so that it should be able to withstand such pressure and bending force. As long as the shaft portion has a sufficient strength, its composition is not particularly restricted.

To form the shell portion around the steel shaft a continuous casting method disclosed in WO 88/07594 is preferably conducted.

FIG. 1 shows an example of an apparatus capable of conducting the above method. This apparatus comprises a composite mold 10 comprising a funnel-shaped refractory mold 1 having a tapered portion and a cylindrical portion and a cooling mold 4 provided under the refractory mold concentrically.

The refractory mold 1 is surrounded by an annular induction heating coil 2, and a lower end of the refractory mold 1 is provided with a concentrical, annular buffer mold 3 having the same inner diameter as that of the refractory mold 1. Attached to a lower end of the buffer mold 3 is a cooling mold 4 having substantially the same inner diameter as that of the buffer mold 3. Cooling water is introduced into the cooling mold 4 through an inlet 14 and discharged through an outlet 14'.

A roll shaft 5 is inserted into a composite mold 10 having the above structure. The shaft 5 is provided with a closure member (not shown) having substantially the same diameter as that of a shell portion to be formed at a lower end of the shaft or at a position appropriately separate from the lower end of the shaft. The lower end of the shaft 5 is mounted to a vertical movement mechanism (not shown). A melt 7 is introduced into a space between the shaft 5 and the refractory mold 1, and a surface of the melt 7 is sealed by a melted flux 6 to prevent the melt from being exposed to the air. And to prevent the solidification of the melt 7, it is heated and stirred by the heating coil 2. The melt 7 is stirred by convection in the direction shown by the arrow A in FIG. 1. Next, the shaft 5 is gradually moved downward together with the closure member fixed thereto. Due to the downward movement of the shaft and the closure member, the melt 7 is lowered and begins to be solidified when contacted with the buffer mold 3 and the cooling mold 4. By this solidification, the shaft and the shell portion are completely metallurgically bonded. The surface of the melt held in the refractory mold 1 is also lowered together with the descent of the shaft 5 and the closure member, but a fresh melt is appropriately supplied to keep the melt surface at a certain level. By successively repeating the descent of the shaft 5 and pouring of the melt 7, the melt 7 is gradually solidified from below to form an outer layer 8.

In the above continuous casting method, in order to achieve the low B content of 300 ppm or less, the flux 6 for sealing the surface of the shaft portion 5 and the surface of the melt for the shell portion is selected from those containing no B or B compounds.

Such a flux 6 consists essentially of $SiO_2$, $Na_2O$ and/or $K_2O$, and oxides of metals other than B for example, Ca, Li, Al, etc.. Specifically, the desired flux composition is 30–70 weight % of $SiO_2$, 10–30 weight % of $Na_2O$ and/or $K_2O$ and 10–35 weight % of at least one of oxides of the above metals.

$SiO_2$ is a main component in the flux, which functions to stably seal the melt without decomposition even at a high temperature. Also, $SiO_2$ has a function to provide the flux 6 with a good refractory property.

$Na_2O$ and $K_2O$ function to improve the flowability of the flux 6 by cutting the network of $SiO_2$.

The oxides of metals other than B are added to adjust the flowability and the surface tension of the flux.

The compound roll thus prepared is further subjected to a heat treatment such as hardening and tempering to obtain a desired hardness of the shell portion.

The wear-resistant compound roll of the present invention has improved resistance to surface roughening and wear resistance. The reason for this advantage is considered that the amount of the non-granular carbides causing surface roughening is restricted, and the reduction of the amount of the granular carbides such as VC, etc. is prevented in the alloy matrix of the shell portion, and that the shell portion has such a composition that its alloy matrix has a considerably high hardness.

The present invention will be explained in further detail by means of the following Examples.

EXAMPLES 1, 2 AND COMPARATIVE EXAMPLES 1–4

Using a steel shaft and each melt for a shell portion having the composition shown in Table 1, a compound roll whose roll portion had a diameter of 350 mm and a length of 600 mm was produced by a continuous casting method. After a heat treatment, the surface of the roll was worked to have such a groove as to produce a shaped rod having a cross section schematically shown in Table 2.

For comparison, each compound roll having the same groove as in each Example was produced by using a melt for a shell portion having a composition in which the B content was more than 300 ppm (Comparative Examples 1, 2). Further, by using a ductile cast iron as a conventional casting material, a roll having the same shape as in each Example was produced as a conventional roll (Comparative Examples 3, 4).

Figure 2A:
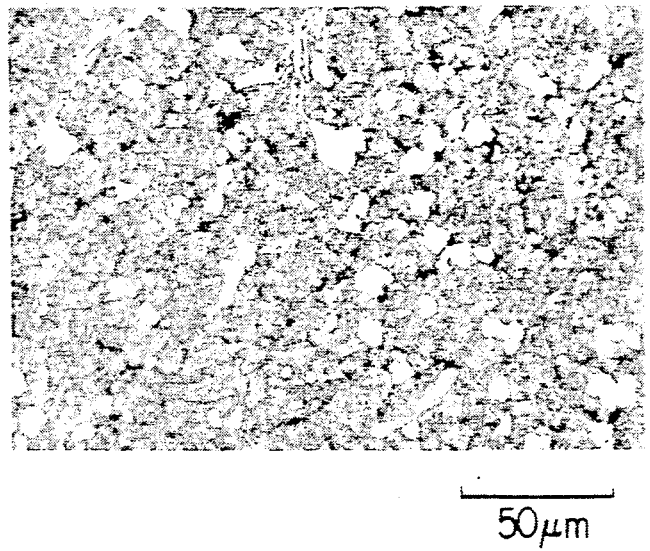
FIG. 2 (a) is a photomicrograph showing the metal structure of the shell portion of the wear-resistant compound roll according to the present invention (Example 1) and FIG. 2 (b) is a photomicrograph showing the metal structure of the shell portion of the wear-resistant compound roll in Comparative Example 1, in which the B content exceeds 300 ppm.
Figure 2B:
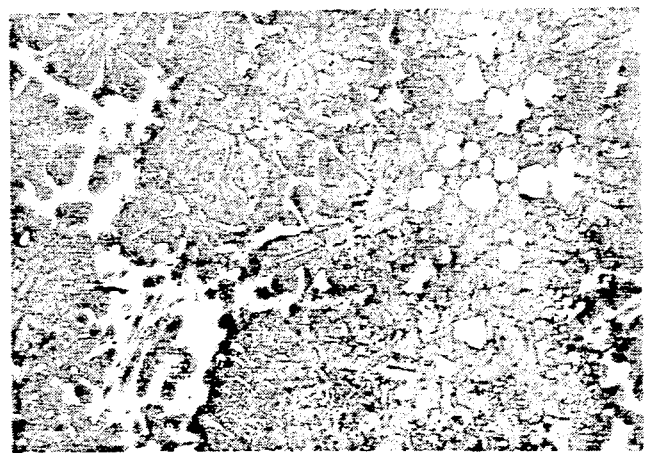

FIG. 2 a shows the microstructure of the shell portion of the compound roll in Example 1, and FIG. 2 (b) shows the microstructure of the shell portion of the compound roll in Comparative Example 1. It is clear from FIGS. 2 (a) and (b) that the amount of the network-shaped non-granular carbides is extremely smaller in Example 1 than in Comparative Example 1.

Incidentally, in each Example and Comparative Example, the heat treatment consisted of hardening at 1040° C. and annealing repeated three times at 530° C.

Next, by using each of these compound rolls, a rolling test was conducted with an actual machine. The rolling test was to measure how many tons of a rolled product can be obtained in a single reforming cycle of the roll. The rolling test results are shown by the increase of the amount of the rolled product relative to that obtained by using each conventional compound roll (Comparative Examples 3, 4). The results are shown in Table 2.

Further, with respect to each Example 1, 2 and Comparative Example 1, 2, the area ratios of granular carbides and non-granular carbides, the Shore hardness and the bending strength of the shell portion were measured.

The results are shown in Table 3.

TABLE 1

| Sample[1] No. | Composition of Iron-Base Alloy of Shell Portion (weight %) | | | | | | |
|---|---|---|---|---|---|---|---|
| | C | Si | Mn | P | S | Ni | Cr |
| 1 | 2.21 | 0.83 | 0.43 | 0.035 | 0.015 | 0.10 | 4.15 |
| 2 | 1.82 | 0.65 | 0.31 | 0.041 | 0.012 | 1.14 | 3.56 |
| 3 | 2.50 | 0.76 | 0.37 | 0.037 | 0.011 | 0.12 | 4.23 |
| 4 | 2.16 | 0.78 | 0.41 | 0.039 | 0.010 | 0.98 | 12.55 |
| 5 | 3.36 | 1.42 | 0.53 | 0.031 | 0.014 | 2.48 | 0.52 |
| 6 | 3.32 | 1.41 | 0.47 | 0.034 | 0.015 | 2.50 | 0.55 |

| | Mo | W | V | B | Fe |
|---|---|---|---|---|---|
| 1 | 3.12 | 1.35 | 7.18 | 0.002 | Bal. |
| 2 | 1.56 | 5.48 | 8.21 | 0.003 | Bal. |
| 3 | 4.12 | 4.38 | 6.95 | 0.15 | Bal. |
| 4 | 3.33 | 2.02 | 8.14 | 0.17 | Bal. |
| 5 | 0.53 | — | — | x[2] | Bal. |
| 6 | 0.53 | — | — | x[2] | Bal. |

Note
[1] Sample Nos. 1 and 2: Examples 1 and 2.
Sample Nos. 3–6: Comparative Examples 1–4.
[2] Not measured.

TABLE 2

| Sample[1] No. | Cross Section of Rolled Product | Reduction Ratio (%) | Increase of Amount of Rolled Product (%)[2] |
|---|---|---|---|
| 1 | } (rhombus) | 25.6 | 3.5 |
| 3 | | | 1.8 |
| 5 | | | 1.0 |
| 2 | } (oval) | 27.5 | 2.8 |
| 4 | | | 1.5 |
| 6 | | | 1.0 |

Note
[1]Sample Nos. 1 and 2: Examples 1 and 2.
Sample Nos. 3–6: Comparative Examples 1–4.
[2]Relative value to 1.0 in the case of Sample Nos. 5 and 6 made of conventional ductile cast iron.

TABLE 3

| Sample[1] No. | Shore Hardness (Hs) | Bending Strength (kg/mm²) | Area Ratio of Granular Carbides (%) | Area Ratio of Non-Granular Carbides (%) | Fracture Toughness ($K_{IC}$) (kg/mm$^{3/2}$) |
|---|---|---|---|---|---|
| 1 | 81 | 143 | 11.3 | 1.8 | 88.5 |
| 2 | 85 | 141 | 10.6 | 2.3 | 86.2 |
| 3 | 82 | 128 | 12.4 | 11.1 | 70.1 |
| 4 | 84 | 125 | 11.8 | 10.7 | 72.0 |

Note
[1]Sample Nos. 1 and 2: Examples 1 and 2.
Samples Nos. 3 and 4: Comparative Examples 1 and 2.

As is clear from Table 2, the compound roll of each Example can produce a dramatically increased amount of rolled product as compared to the conventional cast iron roll (ductile cast iron) in Comparative Examples 3 and 4, and shows durability more than two times that of the ductile cast roll. In addition, the compound roll of each Example can produce an increased amount of rolled product than that of each Comparative Example 1, 2. This is due to the fact that since the shell portion of the wear-resistant compound roll of the present invention has a B content of 300 ppm or less, it has much improved resistance to surface roughening than those of Comparative Examples.

EXAMPLE 3 AND COMPARATIVE EXAMPLE 5

Using a steel shaft and a melt for a shell portion having the composition shown in Table 4, a compound roll whose roll portion had a diameter of 600 mm and a length of 1800 mm was produced by a continuous casting method. They were then heat-treated to produce a compound roll for hot rolling.

For comparison, a grain roll having the composition shown in Table 4 was produced by a conventional centrifugal casting method (Comparative Example 5).

These rolls were used as work rolls in an F4 stand in an actual rolling machine. After the rolling operation, the wear of each roll per 1000 tons of rolling was measured. The results are shown in Table 5.

Further, with respect to each of Example 3 and Comparative Example 5, the area ratios of granular carbides and non-granular carbides, the Shore hardness and the bending strength of the shell portion were measured. The results are shown in Table 5.

TABLE 4

| Sample[1] No. | Composition of Iron-Base Alloy of Shell Portion (weight %) | | | | | | |
|---|---|---|---|---|---|---|---|
| | C | Si | Mn | P | S | Ni | Cr |
| 7 | 1.95 | 0.75 | 0.32 | 0.031 | 0.010 | 0.73 | 5.52 |
| 8 | 3.35 | 0.80 | 0.79 | 0.025 | 0.008 | 4.31 | 1.71 |

| | Mo | W | V | B | Fe |
|---|---|---|---|---|---|
| 7 | 2.05 | 1.99 | 6.26 | 0.005 | Bal. |
| 8 | 0.34 | — | — | 0.04 | Bal. |

Note
[1]Sample No. 7: Example 3.
Sample No. 8: Comparative Example 5.

TABLE 5

| Sample[1] No. | Shore Hardness (Hs) | Area Ratio of Granular Carbides (%) | Area Ratio of Non-Granular Carbides (%) | Wear per 1000 tons of Rolled Product (mm$\phi$) |
|---|---|---|---|---|
| 7 | 83 | 10.1 | 1.6 | 0.061 |
| 8 | 78 | — | 38.6 | 0.272 |

Note
[1]Sample No. 7: Example 3.
Sample No. 8: Comparative Example 5.

In the above examples, the iron-base alloys used as the melt for preparing the shell portions are virgin alloys which are produced by mixing new alloy components and melting them. Tables 1 and 4 above show the compositions of the iron-base alloys constituting the formed shell portions. However, with respect to the boron content of the iron-base alloys used as a melt to be introduced into the continuous casting furnace, the boron content was as follows:

| No. | B Content |
|---|---|
| Sample No. 1: | 0.0013% (13 ppm) |
| Sample No. 2: | 0.0021% (21 ppm) |
| Sample No. 3*: | 0.0018% (18 ppm) |
| Sample No. 4*: | 0.0016% (16 ppm) |
| Sample No. 5*: | Not measured |
| Sample No. 6*: | Not measured |
| Sample No. 7: | 0.0016% (16 ppm) |
| Sample No. 8*: | Not measured |

In Tables 1 and 4 above, the boron contents of the formed shell portions, i.e., after continuous casting and sealing with the flux are shown, and we summarize as follows (also showing ppm):

| No. | B Content |
|---|---|
| Sample No. 1: | 0.002% (20 ppm) |
| Sample No. 2: | 0.003% (30 ppm) |
| Sample No. 3*: | 0.15% (1500 ppm) |
| Sample No. 4*: | 0.17% (1700 ppm) |
| Sample No. 5*: | Not measured |
| Sample No. 6*: | Not measured |
| Sample No. 7: | 0.005% (50 ppm) |
| Sample No. 8*: | 0.04% (400 ppm) |

*Comparative examples.

As shown above for examples Nos. 1, 2 and 7, even in the case of using a flux containing no B or B compounds in accordance with the present invention, a small amount (several ppm) of B may contaminate the shell portion from sources such as the melting furnace, the flux used to seal the shaft portion being introduced into the continuous casting furnace, etc. Also, the flux used for covering the molten alloy in the continuous casting furnace may contain a small amount of B. In general, however, the largest source of B is in the flux used for sealing the molten alloy; accordingly, by replacing such a conventional flux with that containing no B or B compounds as in the present invention, it is possible to reduce the B content of the shell portion to 300 ppm or less.

As is clear from Table 5, the wear-resistant compound roll of the present invention has a wear resistance about 4.5 times as high as that of the grain roll of Comparative Example 5. As a result of observation by the naked eye on the surface of the roll of Example 3 after the completion of rolling operation, it was found that it did not suffer from substantial surface roughening. This means that it has sufficient durability as a roll for producing thin plates by a hot rolling method.

As described above in detail, the wear-resistant compound roll of the present invention has the shell portion containing a large amount of granular carbides and a small amount of non-granular carbides. Further, since the shell portion contains hard carbides such as VC, it shows a good wear resistance. Also, the generation of cracks is suppressed, so that the detachment of crystal grains from the shell portion surface at the site of cracks can be prevented. Accordingly, the wear-resistant compound roll of the present invention shows excellent resistance to surface roughening. Therefore, the wear-resistant compound roll of the present invention can produce roll products having various cross-sectional shapes at a high yield (with a long service life).

Also, since a large amount of the rolled product can be produced in each reforming cycle, the frequency of exchanging rolls can be reduced, enhancing the efficiency of rolling operation.

What is claimed is:

1. A method for producing a wear-resistant compound roll comprising a steel shaft portion and a shell portion comprising an iron-base alloy having a structure containing by an area ratio 5-30% of granular carbides and 5% or less of non-granular carbides comprising:
    a) forming said shell portion by a continuous casting method using a melt consisting essentially of 1.0-3.5 weight % of C, 3.0 weight % or less of Si, 1.5 weight % or less of Mn, 2-10 weight % of Cr, 9 weight % or less of Mo, 20 weight % or less of W, 2-15 weight % of V, 0.08 weight % or less of P, 0.06 weight % or less of S, 300 ppm or less of B, the balance being substantially Fe and inevitable impurities, and
    b) sealing the surface of the shaft portion and the surface of the melt forming the shell portion with a flux containing no B or B compounds and consisting essentially of $SiO_2$, at least one of $Na_2O$ and $K_2O$, and at least one oxide of a metal other than B, wherein the resulting shell portion, after sealing, contains 300 ppm or less B.

2. The method as claimed in claim 1, wherein said metal other than B is selected from the group consisting of Ca, Li and Al.

3. The method as claimed in claim 1, wherein said resulting shell portion has a Vickers hardness (Hv) of 550 or more.

4. The method as claimed in claim 1, wherein said resulting shell portion contains 100 ppm or less B.

5. The method according to claim 1, wherein said melt consists essentially of 1.3-2.5% of C, 0.02-2.0% of Si, 0.2-1.2% of Mn, 3-8% of Cr, 1-7% of Mo, 12% or less of W, 3-12% of V, 0.08% or less of P, 0.06% or less of S, 100 ppm or less of B, the balance being substantially Fe and inevitable impurities.

6. The method as claimed in claim 1, wherein said melt further contains 5 weight % or less of Ni.

7. The method as claimed in claim 1, wherein said melt further contains 5 weight % or less of Co.

8. The method as claimed in claim 1, wherein said melt further contains 5 weight % or less of Nb.

9. The method as claimed in claim 1, wherein said melt further contains 5 weight % or less of Ni and 5 weight % or less of Co.

10. The method as claimed in claim 1, wherein said melt further contains, by weight, 5% or less of Ni, 5% or less of Co and 5% or less of Nb.

11. The method as claimed in claim 1, wherein said flux consists essentially of 30-70 weight % of $SiO_2$, 10-30 weight % of at least one of $Na_2O$ and $K_2O$, and 10-35 weight % of said at least one oxide of a metal other than B, wherein the total weight % of the flux is 100.

* * * * *